United States Patent
Takahashi

(10) Patent No.: US 10,678,063 B2
(45) Date of Patent: Jun. 9, 2020

(54) IMAGE PROCESSING DEVICE, DISPLAY DEVICE, CONTROL METHOD FOR IMAGE PROCESSING DEVICE, AND CONTROL PROGRAM

(71) Applicant: SHARP KABUSHIKI KAISHA, Sakai, Osaka (JP)

(72) Inventor: Masayuki Takahashi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/311,448

(22) PCT Filed: Apr. 3, 2017

(86) PCT No.: PCT/JP2017/013959
§ 371 (c)(1),
(2) Date: Dec. 19, 2018

(87) PCT Pub. No.: WO2017/221509
PCT Pub. Date: Dec. 28, 2017

(65) Prior Publication Data
US 2019/0243150 A1 Aug. 8, 2019

(30) Foreign Application Priority Data
Jun. 20, 2016 (JP) .................. 2016-121755

(51) Int. Cl.
*G02B 30/00* (2020.01)
*G06F 3/0487* (2013.01)
(Continued)

(52) U.S. Cl.
CPC ........ *G02B 30/00* (2020.01); *G02B 27/0093* (2013.01); *G06F 3/0487* (2013.01);
(Continued)

(58) Field of Classification Search
CPC .................. G02B 27/22; H04N 13/10; H04N 2013/0074; H04N 13/00; G09F 9/3023;
(Continued)

(56) References Cited

U.S. PATENT DOCUMENTS

| | | | |
|---|---|---|---|
| 5,717,413 A * | 2/1998 | Mizouchi | G02B 27/0093 345/157 |
| 2011/0310127 A1* | 12/2011 | Arai | G06T 3/40 345/660 |
| 2014/0247208 A1* | 9/2014 | Henderek | G06F 3/0481 345/156 |

FOREIGN PATENT DOCUMENTS

| | | |
|---|---|---|
| JP | H09-055959 A | 2/1997 |
| JP | 2014-532206 A | 12/2014 |
| WO | 2013/036236 A1 | 3/2013 |

* cited by examiner

*Primary Examiner* — Tracy Y. Li
(74) *Attorney, Agent, or Firm* — ScienBiziP, P.C.

(57) ABSTRACT

An image from which a three-dimensional sensation that is close to the actual viewing in the natural world is acquired is generated with simple processing. A controller of an image processing device includes: an attention area specifying unit that specifies an attention area out of a plurality of areas formed by dividing an image to be displayed by a display in the vertical direction thereof on a basis of the fixation point detected by a fixation point detecting sensor; and an image processor that generates a post-processing image by performing emphasis processing for at least a part of the attention area with respect to the image.

12 Claims, 13 Drawing Sheets

(51) Int. Cl.
| | |
|---|---|
| *G09G 5/36* | (2006.01) |
| *H04N 13/00* | (2018.01) |
| *G09G 5/00* | (2006.01) |
| *G02B 27/00* | (2006.01) |
| *H04N 13/10* | (2018.01) |
| *G09F 9/302* | (2006.01) |

(52) U.S. Cl.
CPC ............. *G09F 9/3023* (2013.01); *G09G 5/00* (2013.01); *G09G 5/36* (2013.01); *H04N 13/00* (2013.01); *H04N 13/10* (2018.05); *H04N 2013/0074* (2013.01)

(58) Field of Classification Search
CPC ........... G09F 9/00; G06F 3/0487; G09G 5/36; G09G 5/00
See application file for complete search history.

IMAGE PROCESSING DEVICE, DISPLAY DEVICE, CONTROL METHOD FOR IMAGE PROCESSING DEVICE, AND CONTROL PROGRAM

TECHNICAL FIELD

The disclosure below relates to an image processing device for processing an image displayed on a display device.

BACKGROUND ART

Conventionally, there have been proposed various technologies for displaying images that provide natural viewing on a display device for an viewer. As one example, PTL 1 discloses a display device (image display device) that is aimed at displaying a target object (object) in such a manner as to acquire a three-dimensional sensation that is close to actual viewing in the natural world.

For example, when a human being views certain scenery in the natural world, a target object present in the vicinity of a fixation point of the human being is clearly, visually identified because eyes are in focus. In contrast, a target object present at a position away from the fixation point is vaguely, visually identified because eyes are out of focus. This viewing of the target object allows the human being to obtain the three-dimensional sensation.

The display device of PTL 1 is configured to have an object of reproducing this viewing of the target object. More specifically, the display device of PTL 1 is provided with (i) an image editing means for performing diffusion processing (editing processing) for image information representing a target object in accordance with a distance from a fixation point to the target object, and (ii) an image regenerating means for generating pixel information representing each pixel to be displayed on a display screen on the basis of the image information to which the diffusion processing is performed.

In addition, PTL 2 discloses a technology of changing display on a display on the basis of a user's line of sight (how the user views the display of a computer).

CITATION LIST

Patent Literature

PTL 1: JP H09-55959 A (published on Feb. 25, 1977)
PTL 2: JP 2014-532206 T (published on Dec. 4, 2014)

SUMMARY OF INVENTION

Technical Problem

However, in the display device of PTL 1, it is necessary to detect the position of the fixation point with high precision and perform the diffusion processing in accordance with the distance from the fixation point to the target object, in order to generate an image from which a three-dimensional sensation that is close to the actual viewing in the natural world is obtained. Consequently, the processing of generating the image from which the three-dimensional sensation is obtained is relatively complicated.

In addition, in PTL 2, how the display on the display is changed on the basis of the user's line of sight is not specifically indicated.

Therefore, in the technologies of PTLs 1 and 2, there is a problem in that the image from which the three-dimensional sensation is obtained cannot be generated with simple processing.

One aspect of the disclosure has been made to solve the aforementioned problem, and it is an object thereof to provide an image processing device for generating an image from which a three-dimensional sensation that is close to actual viewing in the natural world is obtained, with simple processing.

Solution to Problem

In order to solve the aforementioned problem, regarding an image processing device according to one aspect of the disclosure is configured to communicatively connect to a display device including a display face configured to display an image and a sensor configured to detect on the display face a fixation point of a viewer, the image processing device includes an attention area specifying unit configured to specify an attention area that is an area at which the viewer is gazing, out of a plurality of areas formed by dividing an image to be displayed in a vertical direction of the image on a basis of the fixation point detected by the sensor, and an image processor configured to generate a post-processing image by performing emphasis processing for at least a part of the attention area with respect to the image.

Further, in order to solve the aforementioned problem, regarding a control method for an image processing device according to one aspect of the disclosure that is configured to communicatively connect to a display device including a display face configured to display an image and a sensor configured to detect a fixation point of a viewer on the display face, the control method includes an attention area specifying step of specifying an attention area that is an area at which the viewer is gazing, out of a plurality of areas formed by dividing an image to be displayed in a vertical direction of the image on a basis of the fixation point detected by the sensor, and an image processing step of generating a post-processing image by performing emphasis processing for at least a part of the attention area with respect to the image.

Advantageous Effects of Invention

The image processing device according to one aspect of the disclosure has an effect capable of generating an image from which a three-dimensional sensation that is close to the actual viewing in the natural world is obtained, with simple processing.

In addition, a control method for the image processing device according to one aspect of the disclosure has an effect identical to the above effect.

DESCRIPTION OF EMBODIMENTS

First Embodiment

Hereinafter, a first embodiment of the disclosure will be described in detail on the basis of FIGS. 1 to 5.
Configuration of Display Device 100

Figure 1:
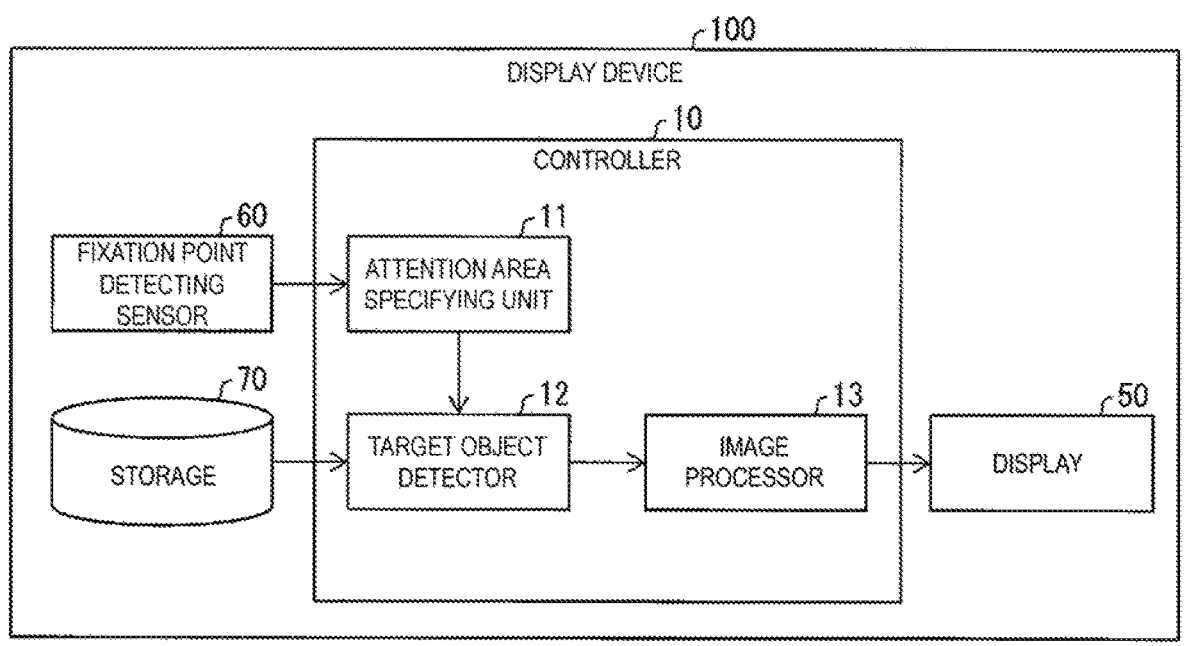
FIG. 1 is a diagram illustrating one example of the configuration of a display device according to a first embodiment.
Figure 2:
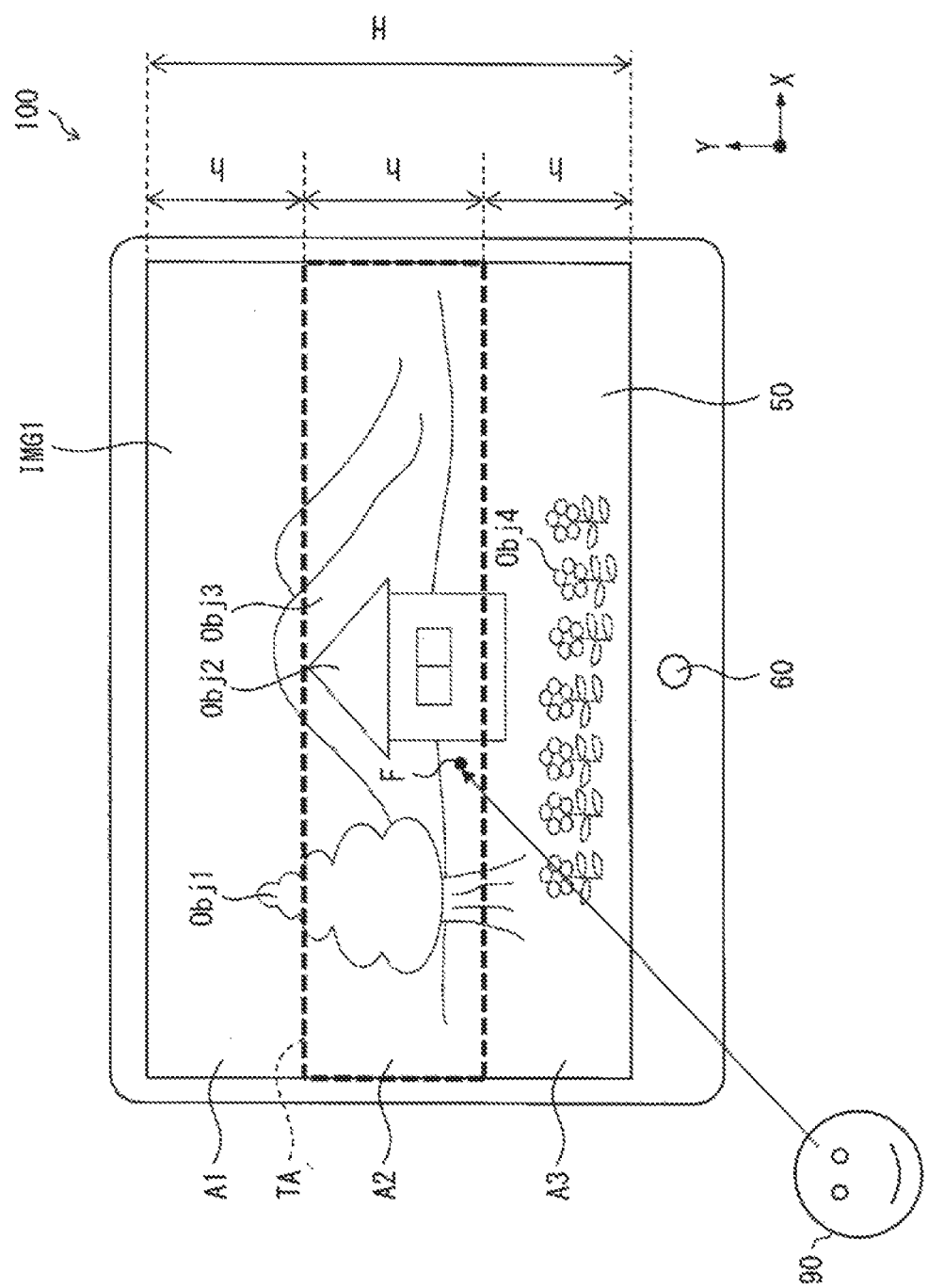
FIG. 2 is a diagram illustrating one example of an image to be displayed on a display of the display device and a plurality of areas formed on the image according to the first embodiment.
Figure 3:
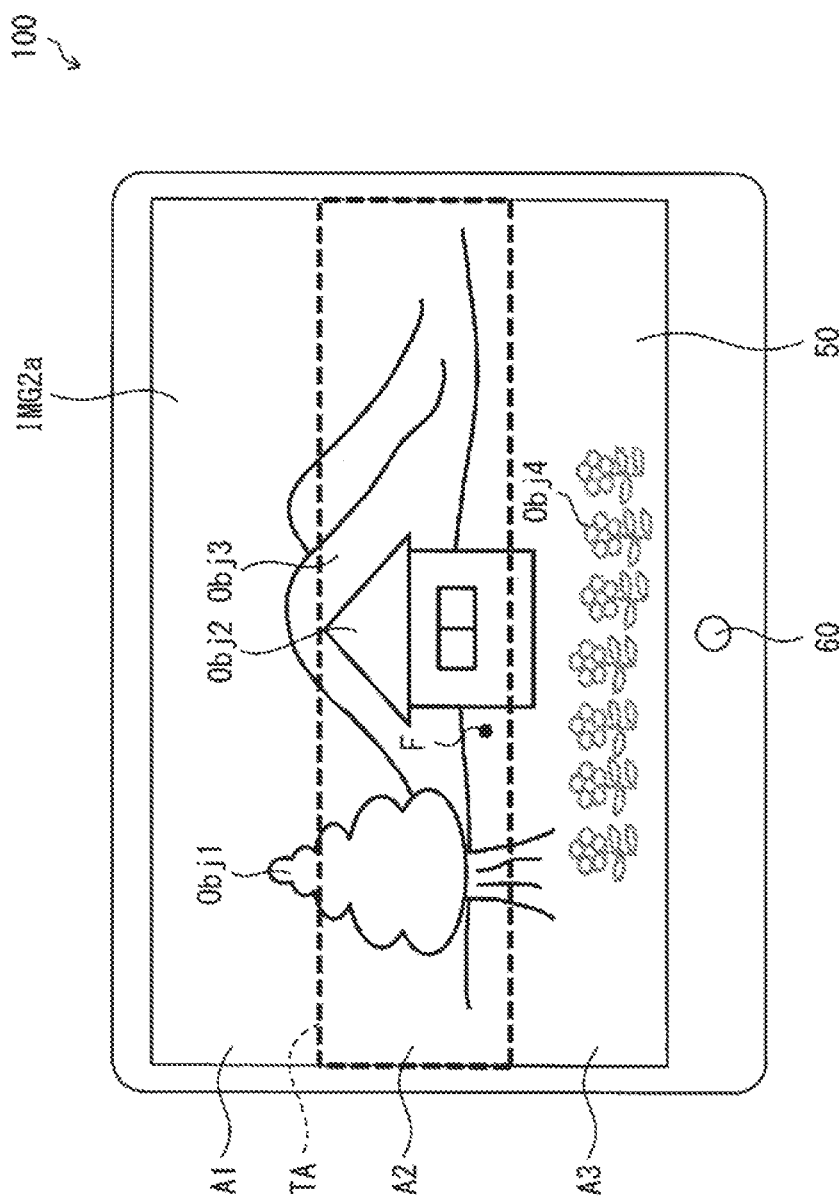
FIG. 3 is a diagram illustrating one example of a post-processing image to be displayed on the display of the display device according to the first embodiment.
Figure 4:
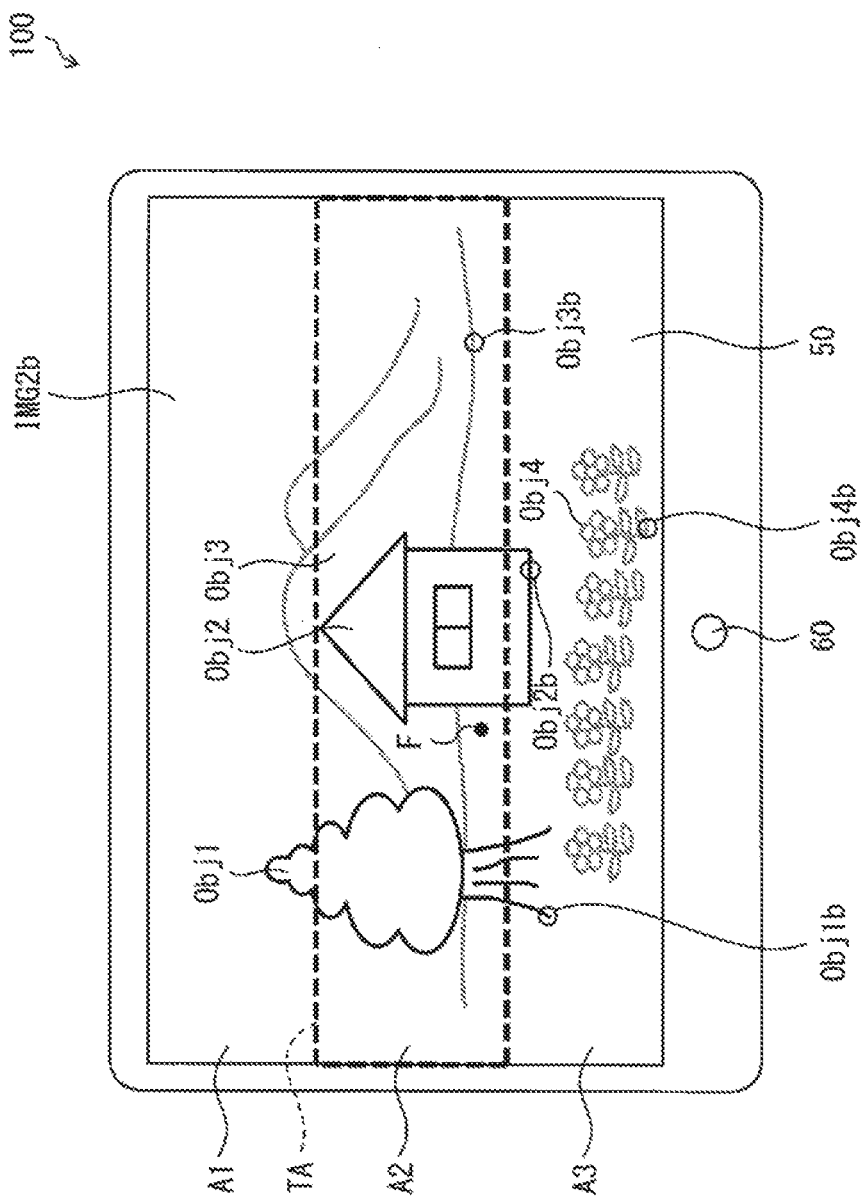
FIG. 4 is a diagram illustrating another example of a post-processing image to be displayed on the display of the display device according to the first embodiment.

First, a display device 100 of the present embodiment will be described with reference to FIGS. 1 to 4. FIG. 1 is a diagram illustrating one example of the configuration of the display device 100. FIG. 2 is a diagram illustrating one example of an image IMG1 to be displayed on a display 50 (display face) and a plurality of areas A1 to A3 formed on the image IMG1. FIG. 3 is a diagram illustrating one example of a post-processing image IMG2a to be displayed on the display 50, and FIG. 4 is a diagram illustrating one example of a post-processing image IMG2b to be displayed on the display 50 (another post-processing image that is different from the post-processing image IMG2a).

Note that, in FIG. 2, for the sake of simplification, an example in which the image IMG1 (input image) prior to processing by a controller 10 is displayed on the display 50, but as described later, an image subsequent to processing by the controller 10 (for example, post-processing images IMG2a and 2b illustrated in FIG. 3 or 4) is actually displayed on the display 50.

As illustrated in FIG. 1, the display device 100 displays images and includes the controller 10 (image processing device), the display 50, a fixation point detecting sensor 60 (sensor), and a storage 70. The controller 10 will be described later.

The display 50 displays images under control of the controller 10 and is constituted by a liquid crystal panel or the like, for example. In the present embodiment, the display 50 displays the post-processing images IMG2a and IMG2b (see FIGS. 3 and 4).

The fixation point detecting sensor 60 detects a fixation point F of a viewer 90 on the display 50 and transmits fixation point data indicating the detected fixation point F to the controller 10. The fixation point detecting sensor 60, for example, detects the movement of the eyeballs of the viewer 90 and is implemented by an eye-tracker or the like that detects the movement of the line of sight of the viewer 90. In addition, the position of the fixation point F, for example, is represented by x and y coordinates randomly set in the display 50.

The storage 70, for example, stores various control programs or the like executed by the controller 10 and is constituted by a nonvolatile storage device such as a hard disk, a flash memory, or the like, for example. For example, image data indicating the image IMG1 or the like is stored in the storage 70.

Note that, in the present embodiment, description will be given on the assumption that the controller 10 reads out the image data that is stored in the storage 70 and indicates the image IMG1 as a still image. However, the present embodiment is not limited to this, it may be such that moving image data indicating moving images is stored in the storage 70, and the moving image data is read out by the controller 10. In this case, the controller 10 may perform image processing described below for each frame forming a moving image.

In addition, the image data or the moving image data is not necessarily stored in advance in the storage 70 and may be acquired by receiving broadcast waves, or may be acquired from an external device (e.g., a video recording device) that stores or generates the image data or the moving image data and that is connected to the display device 100.

Further, the display device 100 is favorably utilized by a device that assumes the detection of the fixation point F by the fixation point detecting sensor 60. This device, for example, includes a personal computer (PC), a multifunctional portable phone (smartphone), a portable information terminal such as a tablet, a television or the like.

As for types of image data described above and the application example of the display device, the same is applied to display devices 200 to 400 in respective embodiments described later.
Specific Configuration of Controller 10

The controller 10 comprehensively controls the display device 100. In the present embodiment, in particular, the controller 10 includes an image processing function of performing predetermined processing for the image IMG1 illustrated in FIG. 2 and includes an attention area specifying unit 11, a target object detector 12 (a first target object detector and a second target object detector), and an image processor 13. Note that the processing of the controller 10 using these members is performed when a viewer is one. That is, when determining that a plurality of viewers watches the display 50 with a face detection function, according to which the faces of viewers are detected, the display device 100 does not perform the aforementioned processing.

The attention area specifying unit 11 specifies an attention area TA that is an area at which the viewer 90 is gazing, out of a plurality of areas A1 to A3 formed by dividing the image IMG1 in the direction orthogonal to the vertical direction of the image IMG1, on the basis of the fixation point F detected by the fixation point detecting sensor 60. That is, the attention area specifying unit 11 specifies the attention area TA in the plurality of areas A1 to A3 and specifies non-attention areas (areas except for the attention area TA).

Specifically, the attention area specifying unit 11 reads out the image data stored in the storage 70 and specifies the vertical direction of the image IMG1 indicated by the image data (Y-axis direction in FIG. 2). Then, as illustrated in FIG. 2, the image IMG1 is divided into the plurality of areas A1 to A3 with respect to the vertical direction. That is, the plurality of areas A1 to A3 in the image IMG1 is formed (set). In addition, in the present embodiment, the widths h (length in the vertical direction) of the plurality of areas A1 to A3 are set in such a manner as to trisect a width H in the Y-axis direction of the image IMG1. Namely, h=H/3 is set.

Generally, as for the image displayed on the display 50, a lower side portion (−Y direction) of the display 50 often corresponds to a close-distance view (a near side of scenery), and an upper side portion (+Y direction) of the display 50 often corresponds to a long-distance view (a far side of scenery). Consequently, the image IMG1 is divided into the plurality of areas A1 to A3 with respect to the vertical direction of the image IMG1, which enables the image processor 13 described later to generate the stereoscopic post-processing image IMG2a or IMG2b in consideration of the perspective of an image (three-dimensional depth of a scene).

Note that the width and the number of plural areas to be divided can be optionally set. At least part of the widths of the plural areas may be different from the widths of another areas. This example will be described in a third embodiment. In addition, the number of plural areas may be two or may be four or more. An example in which the number of plural areas is four or more will be described in a fourth embodiment.

The attention area specifying unit 11 determines whether the fixation point (position coordinates) F indicated by the fixation point data acquired from the fixation point detecting sensor 60 corresponds to any of the position coordinates indicating the plurality of areas A1 to A3 divided in the aforementioned manner. That is, the attention area specifying unit 11 specifies whether the fixation point F is included in any area out of the plurality of areas A1 to A3. Then, the attention area specifying unit 11 specifies an area including the fixation point F as the attention area TA. In the example of FIG. 2, the area A2 is specified as the attention area TA. Further, the areas A1 and A3 are specified as the non-attention areas.

Then, the attention area specifying unit 11 transmits area specifying data indicating correspondence between the plurality of areas A1 to A3, and the attention area TA and the non-attention areas to the target object detector 12.

The target object detector 12 detects target objects Obj1 to Obj4 in the image IMG1. Specifically, the target object detector 12 reads out the image data stored in the storage 70 and detects an edge area indicated by the image data in the image IMG1, thereby detecting the target objects Obj1 to Obj4 (for example, the outlines of the target objects Obj1 to Obj4).

The edge area and the target objects are detected by known methods. The target object detector 12, for example, detects an area in which a difference in pixel values between adjacent pixels is equal to or higher than a predetermined value (an area in which brightness drastically changes) as the edge area and detects a closed area formed by the edge area (or an area regarded as closed) as the target object. In addition, not limited to the detection based on the difference in pixel values, for example, an area in which a difference in values indicating hues is equal to or higher than a predetermined value (that is, an area in which a hue drastically changes) may be detected as the edge area. Further, when depth information indicating a value in a depth direction is included in the image IMG1, edge processing based on the depth information may be performed.

In addition, the target object detector 12 detects in which area, out of the attention area TA and the non-attention areas indicated by the area specifying data, the detected target objects Obj1 to Obj4 are present, and transmits the detection result to the image processor 13.

Note that in the target object detector according to one aspect of the disclosure, a target object detector including a function for detecting that the target objects Obj1 to Obj4 are present in the attention area TA may be referred to as a first target object detector. In addition, in the target object detector according to one aspect of the disclosure, a target object detector including a function for detecting that the target objects Obj1 to Obj4 are present in the non-attention areas may be referred to as a second target object detector.

In the present embodiment, description will be given on the assumption that the target object detector 12 includes the functions of both the first target object detector and the second target object detector. However, the first target object detector and the second target object detector each may be provided as an individual functional unit.

In the example of FIG. 2, the target object Obj1 (tree) is included in the area A2 which is the attention area TA and also included in the areas A1 and A3 which are the non-attention areas. The target object Obj2 (house) is included in the area A2 which is the attention area TA and also included in the area A3 which is the non-attention area. The target object Obj3 (mountain) is included in the area A2 which is the attention area TA and also included in the area A1 which is the non-attention area. The target object Obj4 (flower) is included only in the area A3 which is the non-attention area.

Thus, the target object detector 12 transmits detection results to the effect that the target objects Obj1 to Obj3 are included in the attention area TA (the area A2) and a detection result to the effect that the target object Obj4 is included only in the non-attention area (the area A3) to the image processor 13. In addition, the target object detector 12 transmits coordinate data indicating the positional coordinates of the target objects Obj1 to Obj4 in the image IMG1, along with the detection results, to the image processor 13. Note that when the target object is included both in the attention area TA and in the non-attention area (the target objects Obj1 to Obj3 illustrated in FIG. 2), a detection result to the effect that the target object is included in both areas (included in the area A2 and, the area A1 and/or A3) may be transmitted.

From among the plurality of areas A1 to A3, in the image IMG1 illustrated in FIG. 2, the image processor 13 (i) performs emphasis processing for at least a part of the attention area TA specified by the attention area specifying unit 11 and (ii) performs gradation processing for at least parts of the non-attention areas, thereby generating the post-processing image IMG2a or IMG2b illustrated in FIG. 3 or 4 described below.

That is, the image processor 13 (i) performs processing to generate the post-processing image IMG2a illustrated in FIG. 3 or (ii) performs processing to generate the post-processing image IMG2b illustrated in FIG. 4. Note that the emphasis processing and the gradation processing, for example, are achieved by a known method using filters (a filter for edge emphasis in the emphasis processing and a low pass filter in the gradation processing).

<One Example of Processing PA>

Specifically, when generating the post-processing image IMG2a illustrated in FIG. 3, the image processor 13 (i) performs the emphasis processing for a target object at least a part of which is present in the attention area TA and (ii) performs the gradation processing for a target object that is present only in the non-attention area, on the basis of the detection results acquired by the target object detector 12. In some cases, this processing is referred to as processing PA.

As described above, in the example of FIG. 2, as for the target objects Obj1 to Obj3, the parts thereof are included in the attention area TA in the image IMG1. Thus, the image processor 13 specifies the positions of the target objects Obj1 to Obj3 in the image IMG1 using the coordinate data and performs the emphasis processing for the target objects Obj1 to Obj3 as illustrated in FIG. 3. That is, the edge areas of the target objects Obj1 to Obj3 are emphasized. In addition, when the whole of a target object is included in the attention area TA, the image processor 13 performs the emphasis processing for the target object.

In contrast, in the image IMG1, the target object Obj4 is present only in the non-attention area (the area A3). Thus, in the processing PA, the image processor 13 specifies the position of the target object Obj4 in the image IMG1 using the coordinate data and performs the gradation processing for the target object Obj4 as illustrated in FIG. 3. That is, the edge areas of the target object Obj4 are blurred.

Note that, in the example of FIG. 2, as described above, the target object Obj1 is present while extending over all the areas A1 to A3. Consequently, in the processing PA, the emphasis processing is performed for the target object Obj1 irrespective of whether the attention area TA is the area A1 or the area A3. In addition, the target object Obj2 is present while extending over the areas A2 and A3, and thus the emphasis processing is performed for the target object Obj2 in the case where the attention area TA is the area A2 or A3, and the gradation processing is performed for the target object Obj2 in the case where the attention area TA is the area A1. The target object Obj3 is present while extending over the areas A1 and A2, and thus the emphasis processing is performed for the target object Obj3 in the case where the attention area TA is the area A1 or A2, and the gradation processing is performed for the target object Obj3 in the case where the attention area TA is the area A3. The target object Obj4 is present only in the area A3, and thus the emphasis processing is performed for the target object Obj4 in the case where the attention area TA is the area A3, and the gradation processing is performed for the target object Obj4 in the case where the attention area is the areas A1 and A2.

One Example of Processing PB

In addition, when generating the post-processing image IMG2b illustrated in FIG. 4, the image processor 13 determines whether or not the emphasis processing is performed for a target object at least a part of which is present in the attention area TA, on the basis of the positions of the lowermost ends Obj1b to Obj4b (lower ends) of the target objects Obj1 to Obj4 in the image IMG1. In some cases, this processing is referred to as processing PB.

In the case of the processing PB, as for respective target objects Obj1 to Obj4, the image processor 13, for example, determines whether or not the entire target object is included only in the attention area TA or the non-attention area, using the detection results. When determining that the whole of a target object is included in the attention area TA, the image processor 13 performs the emphasis processing for the target object. In addition, when determining that the whole of a target object is included only in the non-attention area, the image processor 13 performs the gradation processing for the target object.

In contrast, as for the target objects Obj1 to Obj4, when determining that the entire target object is not included in the attention area TA (that is, a target object is present while extending over the attention area TA and the non-attention area), the image processor 13 specifies the positional coordinates of the lowermost ends Obj1b to Obj4b of the target objects in the image IMG1 using the coordinate data. Then, the image processor 13 determines whether or not the positional coordinates are included in an area that is present at a lower end than the attention area TA.

When determining that the positional coordinates are included in the area that is present at a lower end than the attention area TA, the image processor 13 performs the emphasis processing for the target object. In contrast, when determining that the positional coordinates are not included in the area that is present at a lower end than the attention area TA (that is, the lowermost end of the target object is present in the attention area TA), the image processor 13 performs the gradation processing for the target object.

In the example of FIG. 2, as described above, parts of the target objects Obj1 to Obj3 are included in the attention area TA (the area A2), and the whole of the target object Obj4 is included only in the non-attention area (the area A3). Thus, as illustrated in FIG. 4, the image processor 13 determines that the gradation processing should be performed for the target object Obj4. In contrast, as for the target objects Obj1 to Obj3, the image processor 13 determines whether or not the lowermost ends Obj1b to Obj4b are included in the area A3 at the lower end than the attention area TA.

The lowermost end Obj1b of the target object Obj1 and the lowermost end Obj2b of the target object Obj2 both are included in the area A3. Thus, as illustrated in FIG. 4, the image processor 13 determines that the emphasis processing should be performed for the target objects Obj1 and Obj2. In contrast, the lowermost end Obj3b of the target object Obj3 is not included in the area A3 (included in the attention area TA). Thus, the image processor 13 determines that the gradation processing should be performed for the target object Obj3.

That is, in the processing PB, when the attention area TA is the area A2, the image processor 13 determines that the viewer 90 gazes at the target objects Obj2 and Obj3 that are mainly present in its vicinity, performs the emphasis processing for the target objects Obj2 and Obj3, and performs the gradation processing for the target objects Obj1 and Obj4 besides the target objects Obj2 and Obj3. Thus, even in the case where the viewer 90 watches the target object Obj3 (about the mountain's breast) in the attention area TA, when the attention area TA is the area A2, it is determined that the viewer 90 does not gaze at the target object Obj3, and the gradation processing is performed for the target object Obj3.

The image processor 13 transmits the image data indicating the post-processing image IMG2a or IMG2b, for which the emphasis processing and the gradation processing as described above are performed, to the display 50, thereby causing the display 50 to display the post-processing image IMG2a or IMG2b.

Processing of Display Device 100

Figure 5:
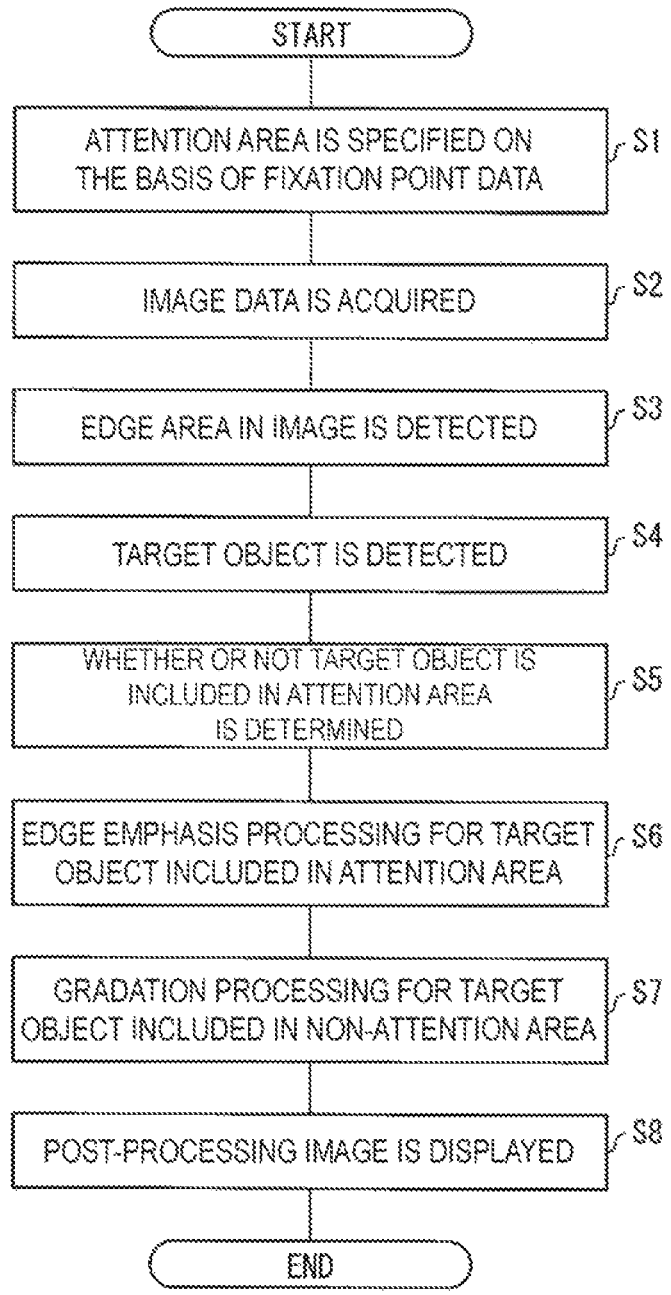
FIG. 5 is a flowchart illustrating one example of processing in the display device according to the first embodiment.

Next, one example of the processing (the control method of the image processing device) of the display device 100 will be described with reference to FIG. 5. FIG. 5 is a flowchart illustrating one example of the processing of the display device 100.

First, the attention area specifying unit 11 reads out the image data from the storage 70 and divides the image IMG1 into the plurality of areas A1 to A3 with respect to the vertical direction of the image IMG1. Then, the attention area specifying unit 11 specifies the attention area TA from the plurality of divided areas A1 to A3 (S1; attention area specifying step) on the basis of the fixation point data indicating the fixation point F detected by the fixation point detecting sensor 60. Subsequently, the target object detector 12 reads out the image data from the storage 70 (S2) and detects an edge area indicated by the image data in the image IMG1 (S3). Then, the target object detector 12 detects the target objects Obj1 to Obj4 included in the image IMG1 using the detected edge area (S4) and detects (determines) in which area, out of the attention area TA and the non-attention areas, the target objects Obj1 to Obj4 are present (S5).

Subsequently, the image processor 13 generates the post-processing image IMG2a or IMG2b on the basis of the detection results of the target object detector 12. Specifically, the image processor 13 performs the emphasis processing for at least a part of the attention area TA in the image IMG1 (S6; image processing step) and performs the gradation processing for at least parts of the non-attention areas (S7; image processing step). Thus, the image processor 13 generates the post-processing image IMG2a or IMG2b in the image IMG1.

More specifically, in the case of the aforementioned processing PA, the image processor 13 performs the emphasis processing for the target objects Obj1 to Obj3 at least parts of which are present in the attention area TA in the S6 on the basis of the detection results. In addition, in the S7, the image processor 13 performs the gradation processing for the target object Obj4 that is present only in the non-attention area (the area A3). Thus, the image processor 13 generates the post-processing image IMG2a illustrated in FIG. 3.

In addition, in the case of the processing PB, the image processor 13 determines whether or not the emphasis processing should be performed for a target object at least a part of which is present in the attention area TA, on the basis of the positions of the lowermost ends Obj1b to Obj4b of the target objects Obj1 to Obj4 in the image IMG1.

Specifically, the image processor 13 makes the determination regarding a target object (the target objects Obj1 to Obj3 in FIG. 4) that exists and extends over two areas including the attention area TA, among the target objects Obj1 to Obj4. As a result, as described above, the image processor 13 determines that the emphasis processing should be performed for target objects Obj1 and Obj2, the lowermost ends Obj1b and Obj2b of which are included in an area (the area A3 in FIG. 4) at a lower end than the attention area TA, and performs the emphasis processing in the S6. In contrast, the image processor 13 determines that the gradation processing should be performed for the target object Obj3, the lowermost end Obj3b of which is not included in the area A3 at the lower end, and performs the gradation processing in the S7.

In addition, a target object that is present without extending over the two areas is present only in the attention area TA or only in the non-attention area. Thus, the image processor 13 performs the emphasis processing for the target object included only in the attention area TA in the S6 and performs the gradation processing for the target object included only in the non-attention area in the S7. In the example of FIG. 4, the whole of the target object Obj4 is present only in the non-attention area (the area A3), and thus the gradation processing is performed for the target object Obj4 in the S7.

Thus, as a result of performing the processing PB, the image processor 13 generates the post-processing image IMG2b illustrated in FIG. 4.

Then, the image processor 13 causes the display 50 to display the generated post-processing image IMG2a or IMG2b (S8).

Note that the processing in the S1 and the processing in the S2 to S4 may be performed in parallel, or the processing in the S1 may be performed after the processing in the S2 to S4. In addition, the processing in the S6 and the processing in the S7 may be performed in parallel, or the processing in the S6 may be performed after the processing in the S7.

Main Effect

As described above, the display device 100 includes the attention area specifying unit 11 and the image processor 13, specifies which area, out of the plurality of areas A1 to A3 divided in the vertical direction of the image IMG1, is the attention area TA on the basis of the fixation point F, and performs the emphasis processing and the gradation processing with respect to the image IMG1 on the basis of the specified results. Thus, the display device 100 can perform the emphasis processing and the gradation processing merely by specifying which area of the display 50 the viewer 90 is gazing at.

Thus, as in the case where the emphasis processing and the gradation processing are performed for the image on the basis of the position of the fixation point, the display device 100 can generate the post-processing image IMG2a or IMG2b from which a three-dimensional sensation that is close to actual viewing in the natural world is acquired, without performing the high-precision detection of the fixation point. In addition, the display device 100 can generate the post-processing image IMG2a or IMG2b, from which the three-dimensional sensation can be acquired, by specifying the attention area TA, without specifying (even when it is impossible to recognize) which target object, out of the target objects Obj1 to Obj4, the viewer 90 is gazing at. Thus, the display device 100 can generate the post-processing image IMG2a or IMG2b, from which the three-dimensional sensation is acquired, with simple processing.

In addition, the display device 100 includes the target object detector 12, and thus can detect the target objects Obj1 to Obj4 present in the image IMG1 and perform the emphasis processing and the gradation processing for the respective target objects Obj1 to Obj4 as in the aforementioned processing PA and PB. Thus, the three-dimensional sensation of the target objects Obj1 to Obj4 in the post-processing image IMG2a or IMG2b can be enhanced.

Herein, the display device 100 determines how the emphasis processing and the gradation processing for the image IMG1 is performed, using the plurality of divided areas A1 to A3 and the fixation point F. Thus, depending on the positional relation between the target objects Obj1 to Obj4 and the attention area TA specified with respect to any area among the plurality of areas A1 to A3, the display device 100 may perform the gradation processing for a target object to which the emphasis processing should be performed and may perform the emphasis processing for a target object to which the gradation processing should be performed. For example, the target object to which the emphasis processing should be performed indicates a target object to which a producer of the image IMG1 wishes the viewer 90 to pay attention. Conversely, a target object to which the gradation processing should be performed, for example, indicates a target object to which the producer of the image IMG1 does not wish the viewer 90 to pay attention.

In the display device 100, it is possible to perform the emphasis processing and the gradation processing for the target objects Obj1 to Obj4 in consideration of the positional relation. In the processing PB, the display device 100 specifies the positions of the lowermost ends Obj1b to Obj4b of the target objects Obj1 to Obj4 at least parts of which are included in the attention area TA by detecting the target objects Obj1 to Obj4. The display device 100 determines whether or not the emphasis processing for the target objects Obj1 to Obj4 should be performed, on these positions.

Consequently, the display device 100 can perform the emphasis processing and the gradation processing on the basis of respective depth positions of the target objects Obj1 to Obj4 in the image IMG1. That is, the display device 100 can take the positional relation into consideration and generate the post-processing image IMG2b in which the three-dimensional sensation of the target objects Obj1 to Obj4 is further enhanced. In addition, the display device 100, for example, can generate the post-processing image IMG2b that includes the three-dimensional sensation that the producer intends.

Further, the display device 100 can perform the emphasis processing and the gradation processing merely by dynamically detecting the edge area with the target object detector 12, and thus it is not necessary to prepare a plurality of images in advance in which the positions in performing the emphasis processing and the gradation processing are changed. In addition, the display device 100 eliminates the need for preparing the plurality of images described above, and thus can relatively easily generate the post-processing image IMG2a or IMG2b even for moving images.

First Modified Example

As described above, the explanation has been given such that the image processor 13 performs the emphasis processing for at least a part of the attention area TA and performs the gradation processing for at least parts of the non-attention areas in the image IMG1, but the configuration is not limited to this. That is, the image processor 13 does not necessarily perform both the emphasis processing and the gradation processing, but may be configured to perform only the emphasis processing for at least a part of the attention area TA.

Namely, in the image processor 13, the gradation processing for at least parts of the non-attention areas is not necessarily required to be performed. This is because even in the case where the image processor 13 performs only the emphasis processing without performing the gradation processing, there occurs a difference in relative viewing between a section where the emphasis processing has been performed and a section where the emphasis processing is not performed. Thus, similarly as described above, the display device 100 can generate the post-processing image IMG2a or IMG2b from which a three-dimensional sensation that is close to the actual viewing in the natural world is acquired.

However, it is preferable that both the emphasis processing and the gradation processing be performed in order to further enhance the three-dimensional sensation. This is because performing the gradation processing for at least parts of the non-attention areas enables the generation of a difference in relative viewing between a section where the gradation processing has been performed and a section where the gradation processing is not performed in the post-processing image IMG2a or IMG2b.

Second Modified Example

As described above, the explanation has been given that the display device 100 includes the controller 10, the display 50, and the fixation point detecting sensor 60, but the configuration is not limited to this. A display device including the controller 10 and the display 50, and the fixation point detecting sensor 60 may be separately configured. For example, an external device (image processing device) capable of communicatively connecting with the display device including the display 50 may include an image processing function of the controller 10. In addition, the fixation point detecting sensor 60 may be communicatively connected with the display device 100 including the controller 10 or the external device.

As for the first and second modified examples, the same is applied to display devices 200 to 400 of respective embodiments described later.

Third Modified Example

Note that, in the display device 100, the configuration for generating the post-processing image from which a three-dimensional sensation that is close to the actual viewing in the natural world is acquired may not be limited to the aforementioned configuration.

As one example, in the image processor 13, only the gradation processing for at least parts of the non-attention areas may be performed. That is, in the image processor 13, the emphasis processing for at least a part of the attention area TA may not be performed. This is because even in the case where the image processor 13 performs only the gradation processing without performing the emphasis processing, there occurs a difference in relative viewing between a section where the gradation processing has been performed and a section where the gradation processing is not performed in the post-processing image IMG2a or IMG2b in the image IMG1.

That is, the display device 100 may be configured to perform any one of (i) the emphasis processing for at least a part of the attention area TA or (ii) the gradation processing for at least parts of the non-attention areas. This is because by performing any one of the emphasis processing or the gradation processing, there occurs a difference in relative viewing between a section where the processing has been performed and a section where the processing is not performed in the post-processing image IMG2a or IMG2b.

Second Embodiment

A second embodiment of the disclosure will be described on the basis of FIG. 6 to FIG. 9 as follows. For the sake of simplicity, members having the same functions as the members described in the foregoing embodiment will be given the same reference signs, and descriptions thereof will be omitted.

Configuration of Display Device 200

Figure 6:
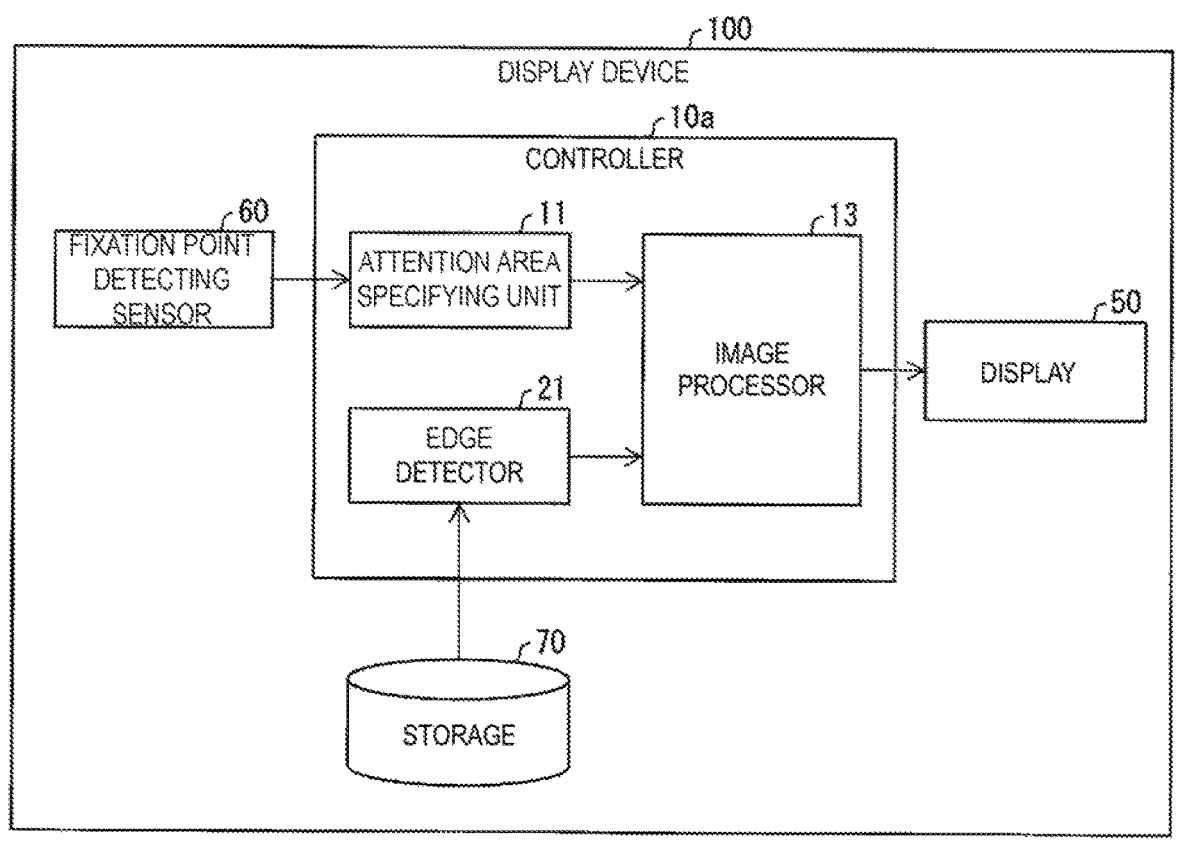
FIG. 6 is a diagram illustrating one example of the configuration of a display device according to a second embodiment.
Figure 7:
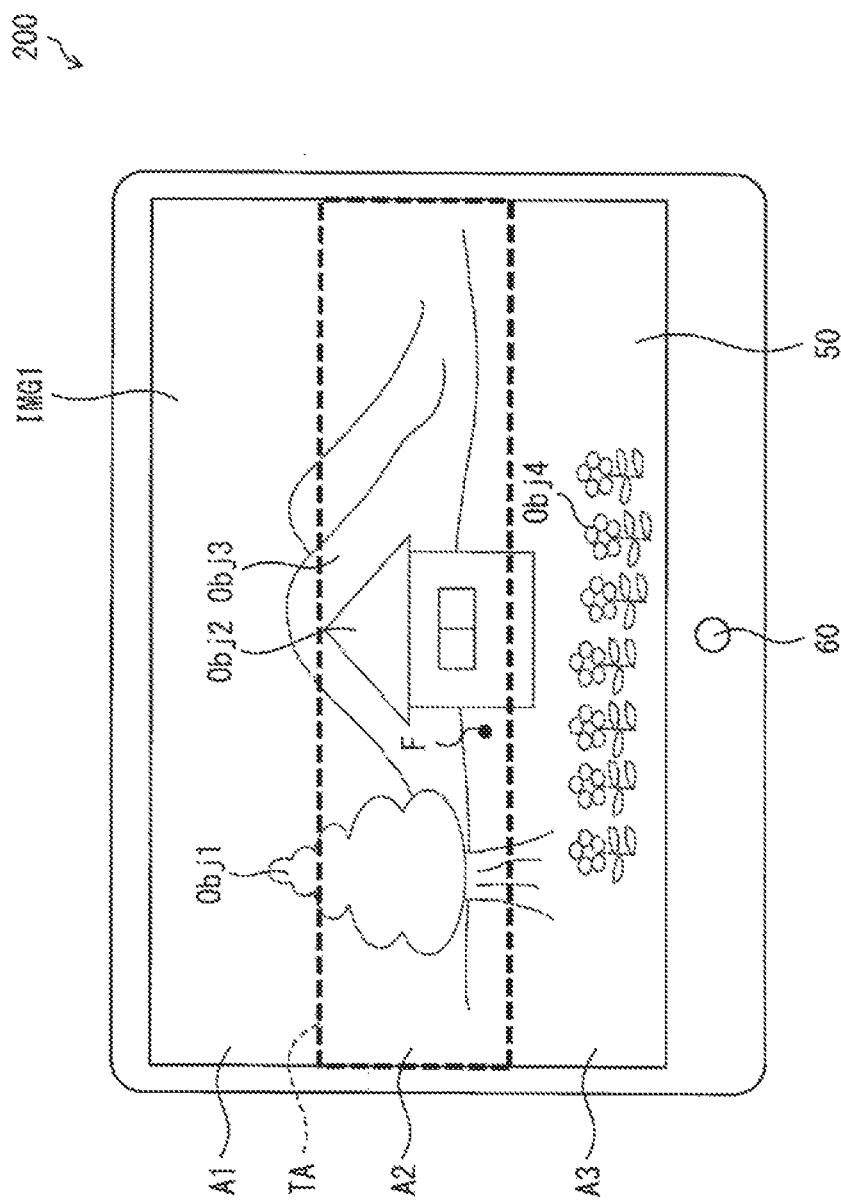
FIG. 7 is a diagram illustrating one example of an image to be displayed on a display of the display device and a plurality of areas formed on the image according to the second embodiment.
Figure 8:
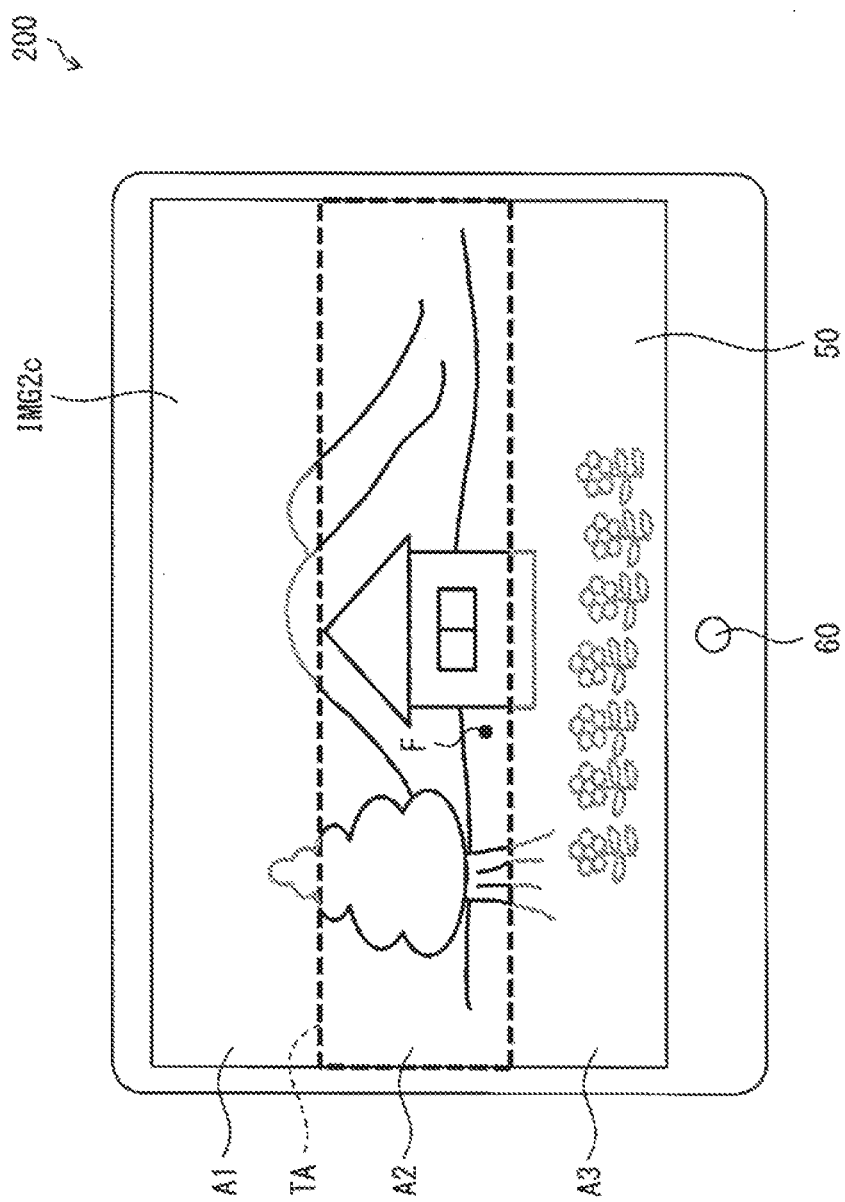
FIG. 8 is a diagram illustrating one example of a post-processing image to be displayed on the display of the display device according to the second embodiment.

First, a display device 200 of the present embodiment will be described with reference to FIGS. 6 to 8. FIG. 6 is a diagram illustrating one example of the configuration of the display device 200. FIG. 7 is a diagram illustrating one example of the image IMG1 to be displayed on the display 50 and the plurality of areas A1 to A3 formed on the image IMG1. FIG. 8 is a diagram illustrating one example of a post-processing image IMG2c to be displayed on the display 50.

As illustrated in FIG. 6, the display device 200 displays images and includes a controller 10a (image processing device), the display 50, the fixation point detecting sensor 60, and the storage 70.

The controller 10a comprehensively controls the display device 200. In the present embodiment, in particular, the controller 10a includes an image processing function of performing predetermined processing for the image IMG1 illustrated in FIG. 7 and includes the attention area specifying unit 11, an edge detector 21, and the image processor 13. Note that the image IMG1 and the plurality of areas A1 to A3 illustrated in FIG. 7 are similar to those illustrated in FIG. 2, and thus the description thereof will be omitted. Hereinafter, a difference between the controller 10 and the controller 10a described in the first embodiment will be mainly described.

Then, the attention area specifying unit 11 transmits area specifying data indicating correspondence between the plurality of areas A1 to A3, and the attention area TA and the non-attention areas to the image processor 13. In the example of FIG. 7, the fixation point F at which the viewer gazes on the display 50 is present in the area A2. Thus, the attention area specifying unit 11 specifies the area A2 as the attention area TA and the areas A1 and A3 as the non-attention area.

The edge detector 21 reads out image data stored in the storage 70, detects an edge area in image IMG1 indicated by the image data in the same manner as that of the target object detector 12 of the first embodiment, and transmits the detection result to the image processor 13. The edge detector 21, which is different from the target object detector 12, detects only the edge area in the image IMG1 and does not detect a target object included in the image IMG1.

On the image IMG1, the image processor 13 (i) performs the emphasis processing for the whole of the attention area TA specified by the attention area specifying unit 11 and (ii) performs the gradation processing for the whole of the non-attention areas, thereby generating a post-processing image IMG2c illustrated in FIG. 8.

That is, the image processor 13 of the present embodiment determines whether any area of the plurality of areas A1 to A3 is the attention area TA and performs the emphasis processing or the gradation processing for each of the plurality of areas A1 to A3. In this point, the image processor 13 of the present embodiment is different from the image processor 13 of the first embodiment that specifies that the target objects Obj1 to Obj4 are present in the attention area TA or in which area, out of the plurality of areas A1 to A3, the lowermost ends thereof are present, and that performs the emphasis processing or the gradation processing for each of the target objects Obj1 to Obj4.

In the example of FIG. 7, the image processor 13 acquires area specifying data and specifies the area A2 as the attention area TA and the areas A1 and A3 as the non-attention area accordingly. Then, as illustrated in FIG. 8, the image processor 13 performs the emphasis processing for the edge area included in the area A2 which is the attention area TA and performs the gradation processing for the edge areas included in the areas A1 and A3 which are the non-attention area, on the basis of the detection results of the edge detector 21. Thus, the image processor 13 generates the post-processing image IMG2c illustrated in FIG. 8.

Processing of Display Device 200

Figure 9:
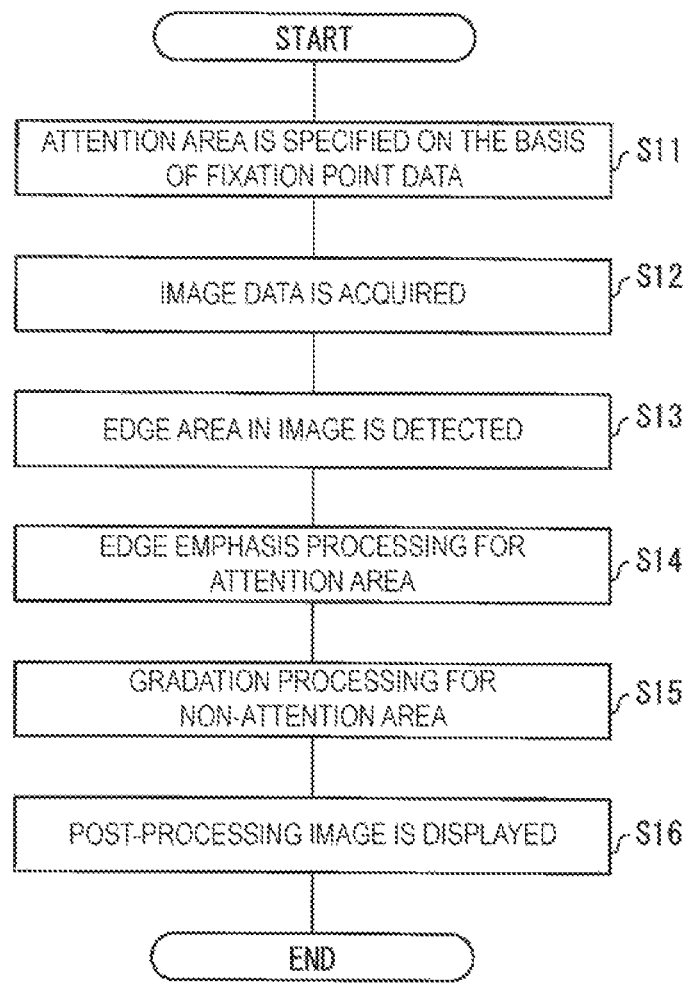
FIG. 9 is a flowchart illustrating one example of processing in the display device according to the second embodiment.

Next, one example of the processing (the control method of the image processing device) of the display device 200 will be described with reference to FIG. 9. FIG. 9 is a flowchart illustrating one example of the processing of the display device 200.

First, the attention area specifying unit 11 divides the image IMG1 into the plurality of areas A1 to A3 with respect to the vertical direction of the image IMG1. Then, the attention area specifying unit 11 specifies the attention area TA from the plurality of divided areas A1 to A3 (S11; attention area specifying step) on the basis of the fixation point data indicating the fixation point F detected by the fixation point detecting sensor 60. Then, the edge detector 21 reads out the image data from the storage 70 (S12) and detects an edge area indicated by the image data in the image IMG1 (S13).

Subsequently, the image processor 13 generates the post-processing image IMG2c illustrated in FIG. 8 on the basis of the detection result of the edge detector 21. Specifically, the image processor 13 performs the emphasis processing for the whole of the attention area TA (S14; image processing step) and performs the gradation processing for the whole of the non-attention areas (S15; image processing step) in the image IMG1. Thus, the image processor 13 generates the post-processing image IMG2c in the image IMG1.

Then, the image processor 13 causes the display 50 to display the generated post-processing image IMG2c (S16).

Note that the processing in the S11 and the processing in the S12 and S13 may be performed in parallel, or the processing in the S11 may be performed after the processing in the S12 and S13. In addition, the processing in the S14 and S15 may be performed in parallel, or the processing in the S14 may be performed after the processing in the S15.

Main Effect

The display device 200 can generate the post-processing image IMG2c, from which the three-dimensional sensation is acquired, by simple processing for the same reason as that of the display device 100.

In addition, the display device 200 performs the emphasis processing for the attention area TA and performs the gradation processing for the non-attention areas without specifying the target objects Obj1 to Obj4. Thus, the display device 200 can generate the post-processing image IMG2c with simpler image processing, compared with the display device 100 of the first embodiment.

In addition, the display device 200 can perform the emphasis processing and the gradation processing merely by dynamically detecting the edge area in the edge detector 21, and thus it is not necessary to prepare a plurality of images in advance in which the positions in performing the emphasis processing and the gradation processing are changed, as similar to the first embodiment. In addition, the display device 200 eliminates the need for preparing the plurality of images described above, and thus can relatively easily generate the post-processing image IMG2c even for moving images.

Third Embodiment

A third embodiment of the disclosure will be described on the basis of FIG. 10 as follows. Note that the display device of the present embodiment is referred to as a display device 300 as distinguished from the aforementioned display devices 100 and 200.

Figure 10:
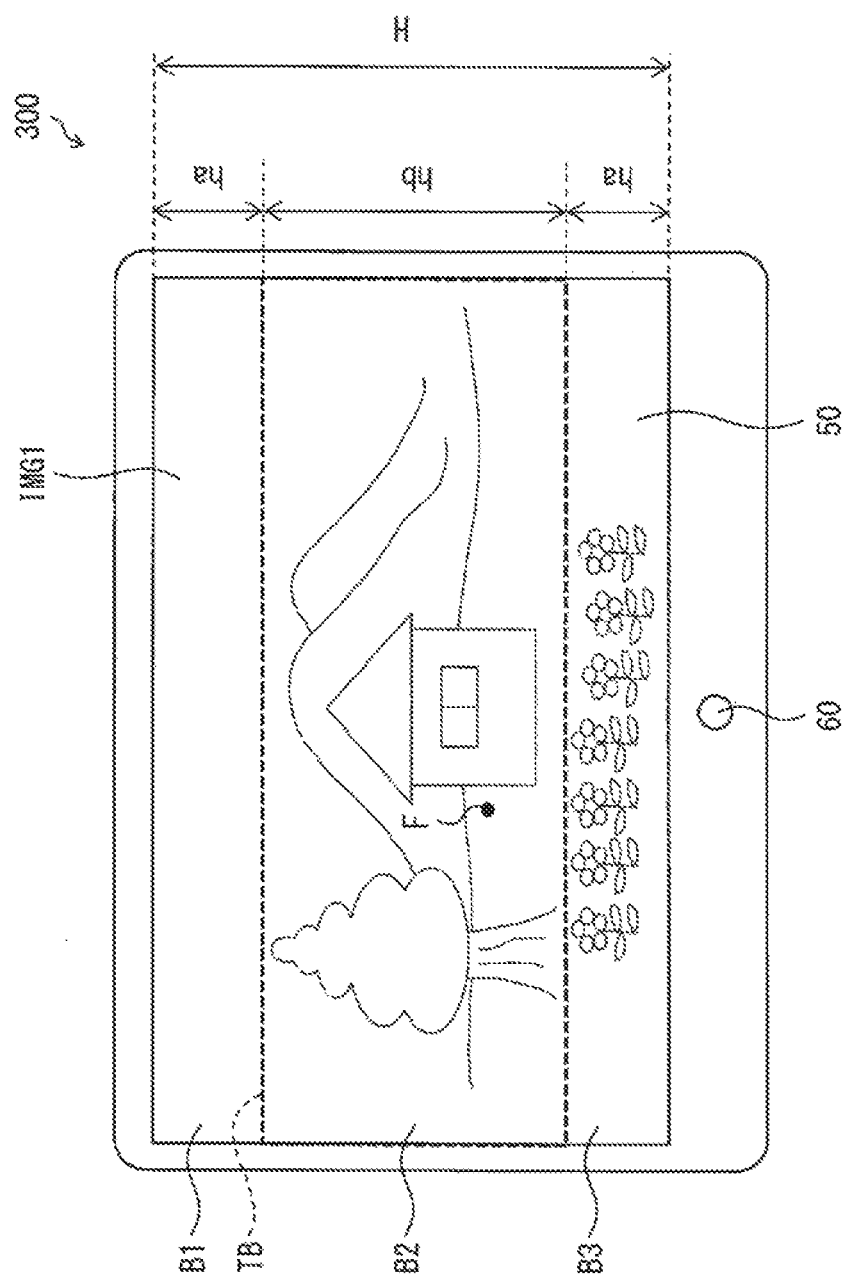
FIG. 10 is a diagram illustrating one example of an image to be displayed on a display of the display device and a plurality of areas formed on the image according to a third embodiment.

In addition, in FIG. 10, an example in which the aforementioned input image (the image IMG1 prior to the processing) is displayed on the display 50 is illustrated to simplify the explanation. However, as described above, it is noted that the post-processing image is actually displayed on the display 50. In this regards, the same is applied to FIGS. 11 to 13 of a fourth embodiment described later.

FIG. 10 is a diagram illustrating one example of the image IMG1 to be displayed on the display 50 and a plurality of areas B1 to B3 formed on the image IMG1. As described above, in the display devices 100 and 200, the widths h of the plurality of areas A1 to A3 are divided in such a manner as to be trisected. In contrast, in the display device 300 of the present embodiment, at least two areas out of the plurality of areas divided in the vertical direction have a different width (length in the vertical direction).

For example, as illustrated in FIG. 10, when the plurality of areas B1 to B3 comprise three areas, the width of one area among them may be different from the widths of another two areas (whose widths are identical), or all the widths of the plurality of areas B1 to B3 may be different from each other. Note that when the plurality of areas comprise two areas, the widths of them may be different from each other, and when the plurality of areas comprise four areas, at least the widths of two areas among them may be different from the widths of the other areas.

As described above, generally, as for the image displayed on the display 50, a lower side portion on the display 50 often corresponds to a close-distance view, and an upper side portion on the display 50 often corresponds to a long-distance view. Consequently, the image IMG1 is divided into the plurality of areas B1 to B3 in the vertical direction of the image IMG1, which enables the image processor 13 to generate the stereoscopic post-processing image in consideration of the perspective of an image to be displayed. As in the present embodiment, the lengths of the areas in the vertical direction are uneven, which enables the image processor 13 to generate the stereoscopic post-processing image in consideration of the perspective. That is, in the display device 300, the three-dimensional sensation of the target object in the post-processing image can be further enhanced.

In addition, in the example of FIG. 10, among the plurality of areas B1 to B3, the width hb of the area B2 disposed between the area B1 of the uppermost part and the area B3 of the lowermost part is different from the width ha of the areas B1 and B3. In addition, the width hb of the area B2 is longer than the width ha of the areas B1 and B3. Note that the same is applied in the case where the plurality of areas comprise is four or more, and in this case, the width of at least one area disposed between the area of the uppermost part and the area of the lowermost part may be longer than the length of the area of the uppermost part and the area of the lowermost part.

In the present embodiment, the width ha of the area B1 of the uppermost part and the area B3 of the lowermost part is set to a length 25 percent shorter than the length H in the vertical direction of the image IMG1 (that is, ha=H/4), and the width hb of the area B2 is set to a length 50 percent shorter than the length H (that is, ha=H/2). However, the values of the widths ha and hb are not limited to these. As long as the width hb of the area B2 is longer than the width ha of the areas B1 and B3 (that is, as long as the width of the area included in the central part of the image IMG1 is longer than the width of the areas of the uppermost part and the lower part), any width may be applied. In addition, as long as the aforementioned condition is satisfied, the width of the uppermost part and the lower part each may be different.

Typically, many viewers often gaze at the area of the central part of the image IMG1, compared with the areas of the uppermost part and the lower part of the image IMG1. In addition, typically, as for many images, in view of this gazing form of the viewers, drawing (photographing) is made in such a manner that a main object to be viewed (a subject) that the producer of the image considers desirable for the viewers to gaze at is disposed in the central area.

As described above, in the display device 300, the width of each area is set in such a manner that the width of at least one area disposed between the area of the uppermost part and the area of the lowermost part is greater than the width of the area of the uppermost part and the area of the lowermost part. That is, the width of each area is set in such a manner that the area of the central part is wider than the area of the uppermost part and the area of the lowermost part.

Thus, the display device 300 can further enhance the three-dimensional sensation of the target object in the post-processing image, compared with a case where the widths in the vertical direction are merely, unevenly set without taking into consideration the uppermost part, the central part, and the lowermost part. Further, the widths are set as described above, thereby generating the post-processing image that allows the viewer to acquire a much more natural three-dimensional sensation (that is, three-dimensional post-processing image having no sense of incongruity).

Further, in the display device 300, the widths of the plurality of areas are set in consideration of the gazing form or the intention of the producer of the image, so that the number of times to specify the attention area TB can be reduced, compared with the first and second embodiments. Thus, the display device 300 can alleviate load in image processing, compared with the first and second embodiments.

Note that the display device 300 can perform the processing of the display device 100 of the first embodiment or the processing of the display device 200 of the second embodiment, and in this case, can achieve the effects of the display device 100 or the display device 200. In this regards, the same is applied to the display device of a fourth embodiment described later.

Fourth Embodiment

A fourth embodiment of the disclosure will be described on the basis of FIGS. 11 to 13 as follows. Note that the display device of the present embodiment is referred to as a display device 400 as distinguished from the aforementioned display devices 100 to 300.

Figure 11:
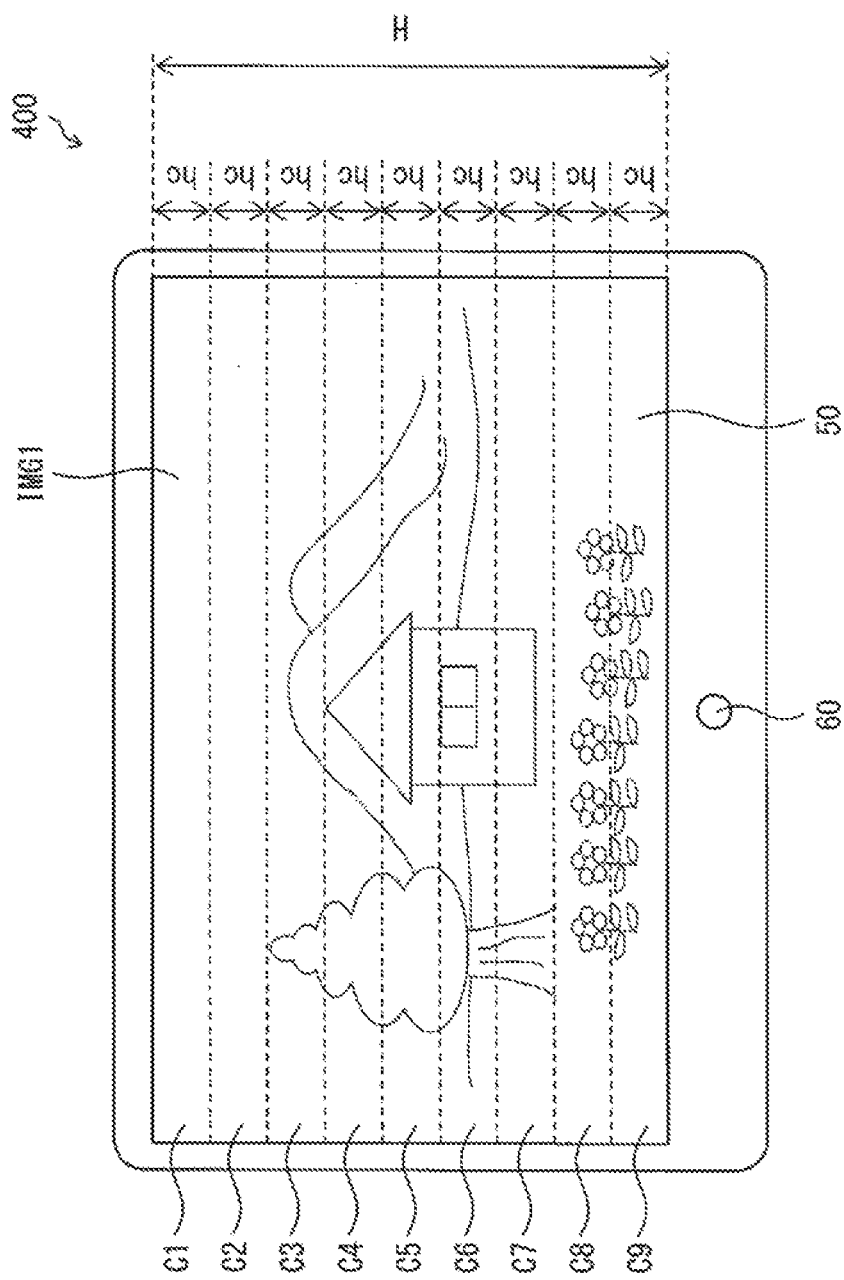
FIG. 11 is a diagram illustrating one example of an image to be displayed on a display of the display device and a plurality of areas formed on the image according to a fourth embodiment.

FIG. 11 is a diagram illustrating one example of the image IMG1 to be displayed on the display 50 and a plurality of areas C1 to C9 formed on the image IMG1. As illustrated in FIG. 11, the display device 400 is different from the aforementioned display devices 100 to 300 in that the number of areas divided in the vertical direction on the image IMG1 is more than three. In the display device 400, nine areas C1 to C9 are set in such a manner that the width H of the image IMG1 in the vertical direction is equally divided into nine. That is, the widths of the areas C1 to C9 (length in the vertical direction) are all represented as hc=H/9.

Figure 12:
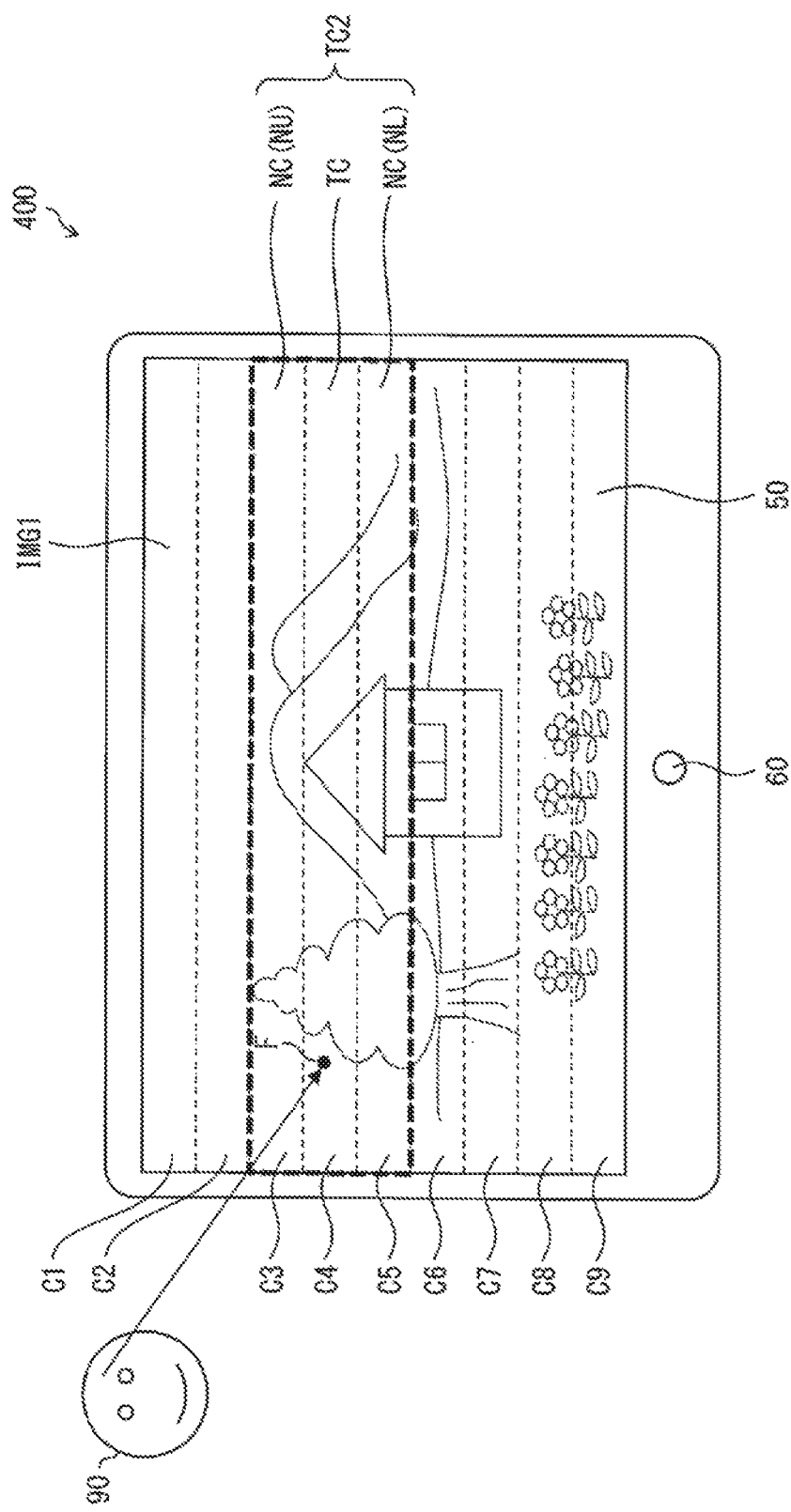
FIG. 12 is a diagram to describe one example of processing in the display device according to the fourth embodiment.
Figure 13:
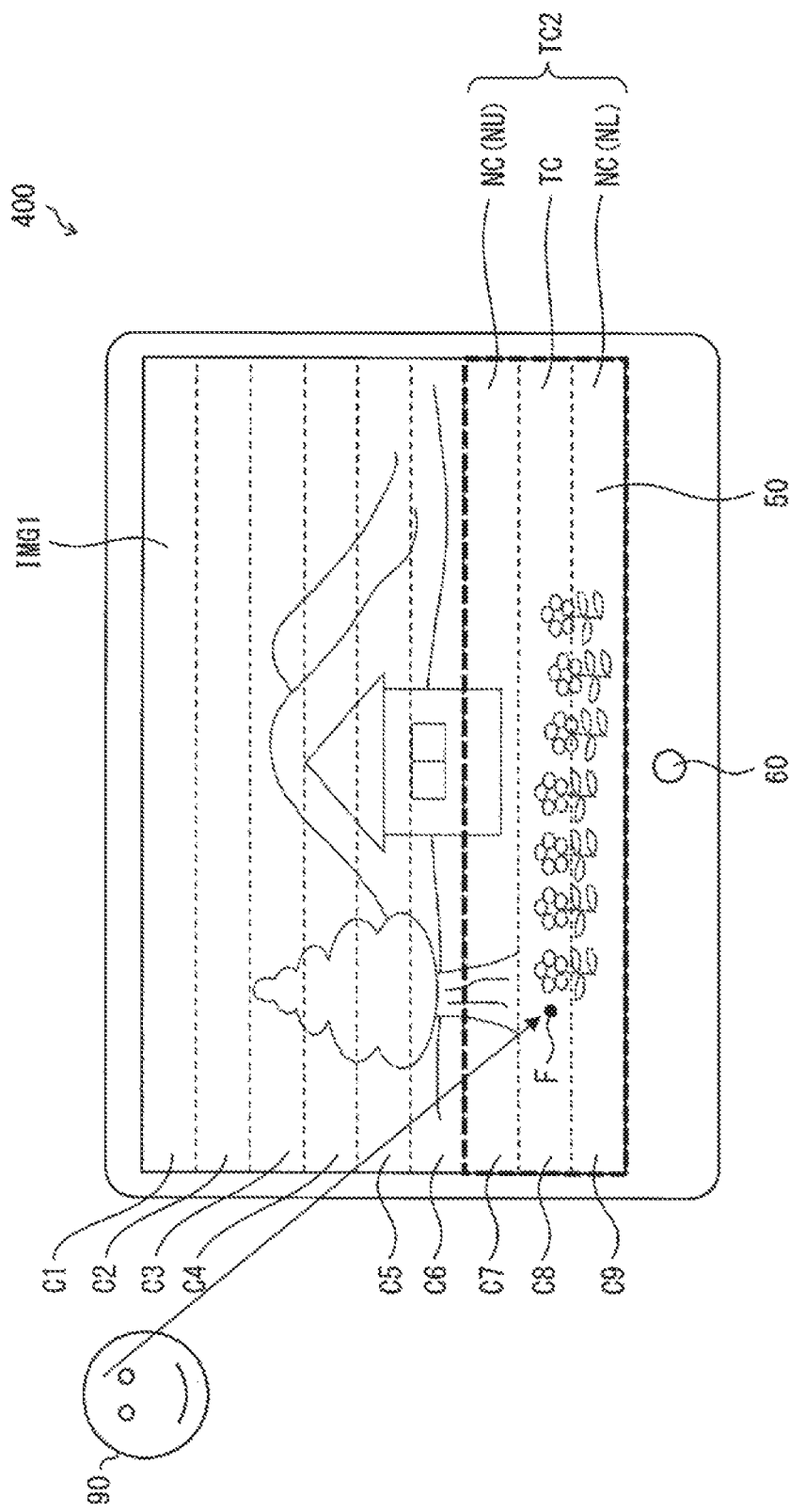
FIG. 13 is a diagram to describe another example of processing in the display device according to the fourth embodiment.

FIGS. 12 and 13 each are diagrams to describe an example of the processing of the display device 400. In FIG. 12, the fixation point F is present in the area C4. In addition, in FIG. 13, the fixation point F is present in the area C8. Thus, cases in which the respective positions of the fixation point F are different are illustrated in FIGS. 12 and 13.

In the display device 400, as is the case with each embodiment described above, the attention area specifying unit 11 specifies an attention area TC on the basis of the fixation point F. As one example, in the case of FIG. 12, the attention area specifying unit 11 specifies the area C4 as the attention area TC. Similarly, in the case of FIG. 13, the attention area specifying unit 11 specifies the area C8 as the attention area TC.

Subsequently, in the display device 400, the attention area specifying unit 11 further specifies proximity areas NC that are areas positioned in the proximity of the attention area TC among the areas C1 to C9. As one example, the attention area specifying unit 11 specifies areas adjacent to the attention area TC in the vertical direction as the proximity areas NC.

Note that a proximity area NC on the upper side of the attention area TC is also referred to as an upper side proximity area NU as distinguished from a plurality of proximity areas NC. Similarly, a proximity area NC on the lower side of the attention area TC is also referred to as a lower side proximity area NL.

In the case of FIG. 12, the attention area specifying unit 11 specifies the area C3 as the upper side proximity area NU and specifies the area C5 as the lower side proximity area NL. That is, the attention area specifying unit 11 specifies the area C3 and the area C5 as the proximity areas NC with respect to the attention area TC (area C4).

Similarly, in the case of FIG. 13, the attention area specifying unit 11 specifies the area C7 as the upper side proximity area NU and specifies the area C9 as the lower side proximity area NL. That is, the attention area specifying unit 11 specifies the area C7 and the area C9 as the proximity areas NC with respect to the attention area TC (area C8).

Subsequently, in the display device 400, the attention area specifying unit 11 sets (specifies) the attention area TC and the proximity areas NC that have been already specified, as a new attention area. Hereinafter, the attention area that has been newly set by the attention area specifying unit 11 is referred to as a new attention area TC2 as distinguished from the attention area TC.

In the case of FIG. 12, the attention area specifying unit 11 sets the area C4 that is the attention area TC and the areas C3 and C5 that are the proximity areas NC as the new attention area TC2. That is, the attention area specifying unit 11 sets (i) three areas C3 to C5 as the new attention area TC2 and (ii) six areas (areas C1 to C2 and C6 to C9) except for the new attention area TC2 as the non-attention areas, respectively.

Similarly, in the case of FIG. 13, the attention area specifying unit 11 sets the area C8 that is the attention area TC and the areas C7 and C9 that are the proximity areas NC as the new attention area TC2. That is, the attention area specifying unit 11 sets (i) three areas C7 to C9 as the new attention area TC2 and (ii) six areas (areas C1 to C6) except for the new attention area TC2 as the non-attention areas, respectively.

Subsequently, in the display device 400, as in the case with each embodiment described above, the image processor 13 (i) performs the emphasis processing for at least a part of the new attention area TC2 and (ii) performs the gradation processing for at least parts of the non-attention areas (example: areas except for the new attention area TC2) in the image IMG1, thereby generating a post-processing image.

Typically, in the case where the fixation point F is in the vicinity of the boundary between areas divided in the vertical direction, there is a high possibility that the attention area TC changes along with movement of the fixation point F. Thus, the viewer might possibly find that the vicinity of the boundary between the areas is awkward in viewing the post-processing image. In addition, this is noticeable in the case where the number of areas divided in the vertical direction is small.

In view of this, the display device 400 is configured to (i) provide areas divided in the vertical direction greater in number than those of the aforementioned display devices 100 to 300 and (ii) set the new attention area TC2 by adding the proximity area NC of the attention area TC to the attention area TC as a margin.

This enables the emphasis processing for the proximity area NC in addition to the attention area TC, so that even when the fixation point F moves, a possibility that the vicinity of the boundary of the attention area TC is awkwardly seen for the viewer can be reduced. This is because in a state where the fixation point F is in the vicinity of the boundary of the attention area TC, when the fixation point F moves to the outside of the attention area TC, the fixation point F after the movement is expected to be present within the proximity area NC.

Thus, according to the display device 400, the emphasis processing can be performed for the wider attention area (the new attention area TC2) than that of the display devices 100 to 300, so that the post-processing image having less sense of incongruity can be provided for the viewer.

Note that, in the present embodiment, the case where the number of areas, divided in the vertical direction in the image IMG1, is nine has been exemplified, but the number of areas is not limited to this and five or more may be applied.

In addition, in the present embodiment, the case where the areas adjacent to the attention area TC in the vertical direction are specified as the proximity area NC has been exemplified, but the method of specifying the proximity area NC is not limited to this.

That is, the attention area specifying unit 11 (i) may specify N1 pieces of areas viewed in the upper direction from the attention area TC as the upper side proximity area NU and (ii) specify N2 pieces of areas viewed in the lower direction from the attention area TC as the lower side proximity area NL. Then, the attention area specifying unit 11 may specify the upper side proximity area NU composed of the N1 pieces of areas and the lower side proximity areas NL composed of the N2 pieces of areas as the proximity area NC. Herein, N1 and N2 are natural numbers. FIGS. 12 and 13 described above correspond to a case where N1=N2=1.

The values of N1 and N2 may be set in advance by the designer of the display device 400 in accordance with the number of areas divided in the vertical direction in the image IMG1. That is, to what extent the range is regarded as "vicinity" from the attention TC may be determined by the designer of the display device 400 as appropriate. In addition, the values of N1 and N2 may be set by a user of the display device 400 in a changeable manner.

Example of Implementation by Software

The control block (in particular, each unit of the controllers 10 and 10a) of the display devices 100, 200, 300, and 400 may be implemented by logic circuits (hardware) formed in integrated circuits (IC chip) or the like or may be implemented by software using a central processing unit (CPU).

In the case of the latter, the display devices 100, 200, 300, and 400 include a CPU that executes the command of a program that is software implementing each function, a read-only memory (ROM) or a storage device (these are referred to as "storage medium") in which the program and various forms of data are stored in a computer- (or CPU-) readable manner, a random access memory (RAM) that expands the program, or the like. Then, the computer (or CPU) reads the program from the storage medium and executes the program, thereby achieving the object of one aspect of the disclosure. As the above-described storage medium, a "non-transitory concrete medium," such as a tape, a disk, a card, a semiconductor memory, or a programmable logic circuit can be used. Furthermore, the above-described program may be supplied to the above-described computer via a chosen transmission medium that can transmit the program (a communication network, broadcast waves, or the like). Note that one aspect of the disclosure can be achieved in the form of data signals embodied by electronic transmission of the programs and buried in a carrier wave.

Supplement

The image processing device (the controller 10) according to one aspect of the disclosure is an image processing device that communicatively connects to the display device (100) including the display face (the display 50) that displays images, and a sensor (the fixation point detecting sensor 60) that detects the fixation point (F) of the viewer (90) on the display face, and the image processing device includes the attention area specifying unit (11) that specifies the attention area (TA, e.g., A2) that is an area at which the viewer is gazing, out of a plurality of areas (A1 to A3) formed by dividing an image (IMG1) to be displayed in the vertical direction of the image on the basis of the fixation point detected by the sensor, and the image processor (13) that generates a post-processing image (e.g., IMG2a) by performing emphasis processing for at least a part of the attention area with respect to the image.

According to the aforementioned configuration, the image processor can perform the emphasis processing for the image on the basis of the result of specifying the attention area by the attention area specifying unit on the basis of the fixation point. That is, the image processor can generate a post-processing image that causes a difference in relative viewing between a section where the emphasis processing has been performed and a section where the emphasis processing is not performed, merely by specifying which area of the display the viewer is gazing at.

Thus, the image processor can generate the post-processing image from which the three-dimensional sensation that is close to the actual viewing in the natural world is acquired without performing the high-precision detection of the fixation point. Thus, an effect capable of generating the post-processing image from which the three-dimensional sensation is acquired with simple processing is achieved.

In the aforementioned first aspect, the image processing device according to the second aspect of the disclosure may detect the target objects (Obj1 to Obj4) in the image and further include the first target object detector (the target object detector 12) for detecting whether the target objects are present in the attention area, and the image processor may perform the emphasis processing for the target object (example: Obj1 to Obj3) at least a part of which is present in the attention area.

According to the aforementioned configuration, the emphasis processing can be performed for the target object, at least a part of which is present in the attention area in accordance with the position at which each target object is present. Thus, an effect capable of enhancing the three-dimensional sensation of each target object in the post-processing image is achieved.

In the aforementioned second aspect, the image processing device according to the third aspect of the disclosure may be such that the image processor determines whether or not the emphasis processing should be performed for the target object at least one part of which is present in the attention area, on the basis of the position of the lower end (the lowermost ends Obj1b to Obj4b) of the target object in the image.

According to the aforementioned configuration, the positional relation of each target object in the image can be more specifically taken into consideration, and the target object for which the emphasis processing is performed can be determined. Thus, an effect capable of enhancing the three-dimensional sensation of each target object in the post-processing image is achieved.

In the aforementioned first aspect, the image processing device according to the fourth aspect of the disclosure may be such that the image processor performs the emphasis processing for the whole of the attention area.

According to the aforementioned configuration, the emphasis processing for the image can be performed without specifying each target object. Thus, an effect capable of easily generating the post-processing image is achieved.

In any one of the aforementioned first to fourth aspects, as for the image processing device according to the fifth aspect of the disclosure, it is preferable that the image processor further perform the gradation processing for at least parts of the non-attention areas (example: A1 and A3) that are areas except for the attention area, among the plurality of areas.

According to the aforementioned configuration, the gradation processing for the image can be further performed for at least parts of the non-attention areas. This enables a difference in relative viewing between a section where the gradation processing has been performed and a section where the gradation processing is not performed in the post-processing image. Thus, an effect capable of enhancing the three-dimensional sensation in the post-processing image is achieved.

In the aforementioned fifth aspect, the image processing device according to the sixth aspect of the disclosure may detect the target objects in the image and further include the second target object detector (the target object detector 12) for detecting whether the target objects are present in the non-attention area, and the image processor may perform the gradation processing for the target object (example: Obj4) that is present only in the non-attention area.

According to the aforementioned configuration, the gradation processing can be further performed for the target object which is present only in the non-attention area in accordance with the position at which each target object is present. Thus, an effect capable of enhancing the three-dimensional sensation of each target object in the post-processing image is achieved.

In the aforementioned fifth aspect, the image processing device according to the seventh aspect of the disclosure may be such that the image processor performs the gradation processing for the whole of the non-attention area.

According to the aforementioned configuration, the gradation processing for the image can be further performed in the case where each target object is not specified. Thus, an effect capable of easily generating the post-processing image is achieved.

In any one of the aforementioned first to seventh aspects, as for the image processing device according to the eighth aspect of the disclosure, it is preferable that at least two areas (example: areas B1 and B2) among the plurality of areas be different in length in the vertical direction.

According to the aforementioned configuration, the lengths of respective areas in the vertical direction are uneven, which enables the image processor 13 to generate the three-dimensional post-processing image further in consideration of the perspective. That is, an effect capable of further enhancing the three-dimensional sensation of each target object in the post-processing image is achieved.

In the aforementioned eighth aspect, as for the image processing device according to the ninth aspect of the disclosure, it is preferable that the length in the vertical direction of at least one area (B2) disposed between the area (area B1) of an uppermost part and the area (area B3) of a lowermost part among the plurality of areas be greater than that of the area of the uppermost part and the area of the lowermost part.

As described above, typically, viewers often gaze at the area of the central part of the display (at least one area disposed between the area of the uppermost part and the area of the lower part), compared with the areas of the uppermost part and the lower part of the display. In addition, typically, as for many images, in view of this gazing form of the viewers, drawing (photographing) is made in such a manner that a main object to be viewed (a subject) that the producer of the image considers desirable for the viewers to gaze at is disposed in the central area.

Thus, according to the aforementioned configuration, the width of the area of the central part is set greater than the width of the area of the uppermost part and the area of the lowermost part, and thus an effect of capable of further enhancing the three-dimensional sensation of the target object in the post-processing image is achieved, compared with a case where the widths in the vertical direction are merely, unevenly set without taking into consideration the uppermost part, the central part, and the lowermost part.

In any one of the aforementioned first to ninth aspects, as for the image processing device according to the tenth aspect of the disclosure, it is preferable that the attention area specifying unit further specify the proximity areas (NC) that are areas disposed in the proximity of the attention area (TC) among the plurality of areas and set the attention area and the proximity areas as a new attention area (new attention areas TC2).

According to the aforementioned configuration, in the image processing device, the new attention area can be set by adding the proximity area of the attention area TC to the attention area TC as a margin. That is, the emphasis processing can be performed for the proximity area, in addition to the attention area. Thus, as described above, even when the fixation point moves to the outside of the attention area, a possibility that the vicinity of the boundary of the attention area is awkwardly seen for the viewer can be reduced. Consequently, an effect capable of providing the post-processing image having much less sense of incongruity for the viewer is achieved.

It is preferable that the display device according to the eleventh aspect of the disclosure include the image processing device according to any one of the aforementioned first to tenth aspects.

According to the aforementioned configuration, an effect identical to that of the image processing device according to one aspect of the disclosure is achieved.

As for a control method according to the twelfth aspect of the disclosure for an image processing device configured to communicatively connect to a display device including a display face configured to display an image and a sensor configured to detect a fixation point of a viewer on the display face, the control method includes an attention area specifying step of specifying an attention area that is an area at which the viewer is gazing, out of a plurality of areas formed by dividing an image to be displayed in a direction orthogonal to a vertical direction of the image on a basis of the fixation point detected by the sensor, and an image processing step of generating a post-processing image by performing emphasis processing for at least a part of the attention area with respect to the image.

According to the aforementioned configuration, an effect identical to that of the image processing device according to one aspect of the disclosure is achieved.

The image processing device according to each aspect of the disclosure may be implemented by a computer, and in this case, by causing the computer to operate as each unit (software element) included by the image processing device, the scope of the disclosure includes the control program of the image processing device that causes the computer to implement the image processing device and a computer-readable storage medium that stores the control program.

Additional Items

The disclosure is not limited to each of the embodiments stated above, and various modifications may be implemented within a range not departing from the scope of the claims. Embodiments obtained by appropriately combining technical approaches stated in each of the different embodiments also fall within the technical scope of the disclosure. Moreover, novel technical features may be formed by combining the technical approaches stated in each of the embodiments.

CROSS-REFERENCE OF RELATED APPLICATION

This application claims benefit of priority based on Japanese Patent Application No. 2016-121755 filed in Japan on Jun. 20, 2016, of which the content is entirely incorporated herein by reference.

REFERENCE SIGNS LIST 10, 10a Controller (image processing device)
11 Attention area specifying unit
12 Target object detector (first target object detector, second target object detector)
13 Image processor
50 Display (display face)
60 Fixation point detecting sensor (sensor)
90 Viewer
100, 200, 300, 400 Display device
A1 to A3, B1 to B3, C1 to C9 Area
B1 Area (area of uppermost part)
B3 Area (area of lowermost part)
F Fixation point
h, ha, hb, hc Width (length in vertical direction)
IMG1 Image
IMG2a, IMG2b, IMG2c Post-processing image
Obj1, Obj2, Obj3, Obj4 Target object
TA, TB, TC Attention area
TC2 New attention area (new attention area)
NC Proximity area

The invention claimed is:

1. An image processing device configured to communicatively connect to a display device including a display face displaying an image and a sensor detecting on the display face a fixation point of a viewer, the image processing device comprising:

attention area specifying circuitry specifying an attention area that is an area at which the viewer is gazing, out of a plurality of areas formed by dividing an image to be displayed in a vertical direction of the image on a basis of the fixation point detected by the sensor;

image processing circuitry generating a post-processing image by performing emphasis processing for at least a part of the attention area with respect to the image; and first target object detect circuitry detecting a target object in the image and detecting whether the target object is present in the attention area;

wherein the first target object detect circuitry detects the target object on a basis of an edge area in the image, and the image processing circuitry performs the emphasis processing for the target object at least a part of which is present in the attention area.

2. The image processing device according to claim 1, wherein the image processing circuitry determines whether or not to perform the emphasis processing for the target object at least a part of which is present in the attention area on a basis of a position of a lower end of the target object in the image.

3. The image processing device according to claim 1, wherein the image processing circuitry performs the emphasis processing for the attention area entirely.

4. The image processing device according to claim 1, wherein the image processing circuitry further performs gradation processing for at least a part of a non-attention area that is an area except for the attention area, among the plurality of areas.

5. The image processing device according to claim 4, further comprising second target object detect circuitry detecting a target object in the image and detecting whether the target object is present in the non-attention area, wherein the image processing circuitry performs the gradation processing for the target object only present in the non-attention area.

6. The image processing device according to claim 4, wherein the image processing circuitry performs the gradation processing for the non-attention area entirely.

7. The image processing device according to claim 1, wherein at least two areas out of the plurality of areas differ in length in the vertical direction.

8. The image processing device according to claim 7, wherein at least one area disposed between an area of an uppermost part and an area of a lowermost part among the plurality of areas is such that a length thereof in the vertical direction is greater than that of the area of the uppermost part and the area of the lowermost part.

9. The image processing device according to claim 1, wherein the attention area specifying circuitry further specifies a proximity area that is an area disposed in a proximity of the attention area among the plurality of areas and sets the attention area and the proximity area as a new attention area.

10. A display device comprising:
the image processing device according to claim 1.

11. A control method for an image processing device configured to communicatively connect to a display device including a display face displaying an image and a sensor detecting a fixation point of a viewer on the display face, the control method comprising:

an attention area specifying step of specifying an attention area that is an area at which the viewer is gazing, out of a plurality of areas formed by dividing an image to be displayed in a vertical direction of the image on a basis of the fixation point detected by the sensor;

an image processing step of generating a post-processing image by performing emphasis processing for at least a part of the attention area with respect to the image; and a first target object detecting step of detecting a target object in the image and detecting whether the target object is present in the attention area;

wherein the first target object detecting step detects the target object on a basis of an edge area in the image, and the image processing step performs the emphasis processing for the target object at least a part of which is present in the attention area.

12. A non-transitory computer-readable computer medium storing a control program configured to cause a computer to function as the image processing device according to claim 1, wherein the control program causes the computer to function as the attention area specifying circuitry and the image processor.

* * * * *